United States Patent
Harada

(10) Patent No.: US 11,351,672 B2
(45) Date of Patent: Jun. 7, 2022

(54) ROBOT, CONTROL DEVICE, AND ROBOT SYSTEM

(71) Applicant: Seiko Epson Corporation, Tokyo (JP)

(72) Inventor: Tomoki Harada, Azumino (JP)

(73) Assignee: Seiko Epson Corporation

( * ) Notice: Subject to any disclaimer, the term of this patent is extended or adjusted under 35 U.S.C. 154(b) by 575 days.

(21) Appl. No.: 16/143,763

(22) Filed: Sep. 27, 2018

(65) Prior Publication Data
US 2019/0099890 A1    Apr. 4, 2019

(30) Foreign Application Priority Data

Sep. 29, 2017 (JP) .............................. JP2017-189825

(51) Int. Cl.
*B25J 9/16* (2006.01)
*G05B 19/401* (2006.01)

(52) U.S. Cl.
CPC ........... *B25J 9/1697* (2013.01); *B25J 9/1661* (2013.01); *B25J 9/1687* (2013.01); *G05B 19/401* (2013.01)

(58) Field of Classification Search
CPC ......... B25J 9/1687; G05B 2219/40033; G05B 19/401
See application file for complete search history.

(56) References Cited

U.S. PATENT DOCUMENTS

| | | | |
|---|---|---|---|
| 2014/0259644 A1* | 9/2014 | Matsuo | B25J 9/1687 29/714 |
| 2014/0293009 A1 | 10/2014 | Nakazato | |
| 2017/0028561 A1* | 2/2017 | Yamada | B25J 13/082 |
| 2019/0375110 A1* | 12/2019 | Oishi | B25J 13/088 |

FOREIGN PATENT DOCUMENTS

| | | | | |
|---|---|---|---|---|
| EP | 1589483 B1 * | 12/2009 | | G06T 7/75 |
| JP | H07-152420 A | 6/1995 | | |
| JP | 2001-205584 A | 7/2001 | | |
| JP | 2010-188459 A | 9/2010 | | |
| JP | 2011-000668 A | 1/2011 | | |
| JP | 2014-120068 A | 6/2014 | | |
| JP | 2014-202502 A | 10/2014 | | |

* cited by examiner

*Primary Examiner* — Jeff A Burke
*Assistant Examiner* — Madison B Emmett
(74) *Attorney, Agent, or Firm* — Harness, Dickey & Pierce, P.L.C.

(57) ABSTRACT

A robot causes an image capturing device to capture an image of a container in which a plurality of targets are placed to overlap in part with one another, the plurality of targets including components whose types are different from each other among the component and a component kit in which two or more of the components are assembled with one another, detects types, positions and poses of the plurality of targets based on the captured image captured by the image capturing device, determines a priority order of one or more of component kits being assembled using the targets placed in the container according to the detected types, the detected positions and the detected poses, and assembles the component kit selected based on the determined priority order.

8 Claims, 6 Drawing Sheets

ROBOT, CONTROL DEVICE, AND ROBOT SYSTEM

BACKGROUND

1. Technical Field

The present invention relates to a robot, a control device, and a robot system.

2. Related Art

Research and development of technologies for causing a robot to perform work of assembling a finished product, which is completed by assembling a plurality of components with one another, by using the plurality of components has been conducted.

In this regard, there is known a production system in which a component storage unit, in which a plurality of components are stored, and a robot that picks up and collects a plurality of components necessary for producing each product from the component storage unit to form a component kit are disposed, and which includes storage means for storing a component reference image which is an image of each type of previously imaged components and component kit constituent component information which is information on components to be included in a component kit for each product, first imaging means for imaging the component kit actually formed by the robot, first component specifying means for comparing an image of the component kit imaged by first imaging means with the component reference image stored in storage means, extracting a partial image corresponding to the component reference image in the image of the component kit, and specifying the type and number of components actually included in the component kit, and first confirmation means for comparing the type and number of components specified by first component specifying means with component kit constituent component information stored in storage means and confirming that necessary components are included in the component kit without excess or deficiency (see JP-A-2010-188459).

However, in such a production system, there are cases where it is not possible to assemble a plurality of types of component kits different from each other and it is difficult to improve production efficiency of the component kit. In the production system, in a case where a plurality of different types of components different from each other are stored in the component storage unit so as to overlap each other, components necessary for assembling the component kit cannot be taken out from the component storage unit in some cases. As a result, work of assembling the component kit is stopped in the production system in some cases.

SUMMARY

An aspect of the invention is directed to a robot which causes an image capturing device to capture an image a container in which a plurality of targets are placed to overlap at least in part with one another, the plurality of targets including at least components whose types are different from one another among the components and a component kit in which two or more of the components are assembled with one another, detects a type, a position and an pose of each of the plurality of targets based on a captured image captured by the image capturing device, determines a priority order of each of one or more of component kits capable of being assembled using the targets placed in the container according to the detected types, the detected positions and the detected poses, and assembles the component kit selected based on the determined priority order.

With this configuration, the robot can assemble a plurality of types of component kits different from one another and prevent work of assembling the component kits from being stopped.

In another aspect of the invention, the robot may be configured such that the component kit selected based on the determined priority order is assembled, and then the assembled component kit is placed in the container.

With this configuration, the robot can assemble another component kit using the assembled component kits.

In another aspect of the invention, the robot may be configured such that when the assembled component kit is placed in the container, the determined priority order is updated, and the assembled component kit is placed on the target necessary for assembling the component kit having the priority order of the second place or lower after the update.

With this configuration, the robot can prevent the component kit having the first place in the priority order from being not assembled by the placed component kit.

In another aspect of the invention, the robot may be configured such that a finished product is included in the one or more of component kits capable of being assembled using the target placed in the container.

With this configuration, the robot can assemble a plurality of types of component kits different from one another and can assemble a plurality of types of finished products different from one another.

In another aspect of the invention, the robot may be configured such that a priority order of the component kit having the largest number of times of assembling the targets with one another among the component kits capable of being assembled using the component kits included in the targets is determined as the first place.

With this configuration, the robot can improve efficiency of assembling the component kit.

In another aspect of the invention, the robot may be configured such that in a case where there is the component kit capable of being assembled using the component kit assembled immediately before, instead of the component kit having the largest number of times of assembling the targets, the priority order of the component kit capable of being assembled using the component kit assembled immediately before is determined as the first place.

With this configuration, the robot can improve efficiency of assembling the component kit more reliably.

Another aspect of the invention is directed to a control device which controls a robot, and causes an image capturing device to image a container in which a plurality of targets are placed to overlap at least in part with one another, the plurality of targets including at least components whose types are different from one another among the components and a component kit in which two or more of the components are assembled with one another, detects types, positions and poses of the plurality of targets based on a captured image captured by the image capturing device, determines a priority order of one or more component kits capable of being assembled using the targets placed in the container according to the detected types, the detected positions and the detected poses, and causes the robot to assemble the component kit selected based on the determined priority order.

With this configuration, the control device can assemble a plurality of types of component kits different from each other and prevent work of assembling the component kits from being stopped.

Another aspect of the invention is directed to a robot system which includes a robot, an image capturing device, and a control device which controls the robot, and in which the control device causes the image capturing device to image a container in which a plurality of targets are placed to overlap at least in part with one another, the plurality of targets including at least components whose types are different from one another among the components and a component kit in which two or more of the components are assembled with one another, detects types, positions and poses of the plurality of targets based on a captured image captured by the image capturing device, determines a priority order of one or more of the component kits capable of being assembled using the targets placed in the container according to the detected types, the detected positions and the detected poses, and causes the robot to assemble the component kit selected based on the determined priority order.

With this configuration, the robot system can assemble a plurality of types of component kits different from each other and prevent work of assembling the component kits from being stopped.

Another aspect of the invention is directed to a robot system which includes a robot, an image capturing device, and a control device which controls the robot, and in which the control device includes a processor and the processor is configured to execute a command to cause an image capturing device to image a container in which a plurality of targets are placed to overlap at least in part with one another, the plurality of targets including at least components whose types are different from one another among the component and a component kit in which two or more of the components are assembled with one another, to detect types, positions and poses of the plurality of targets based on a captured image captured by the image capturing device, to determine a priority order of one or more of the component kits capable of being assembled using the targets placed in the container according to the detected types, the detected positions and the detected poses, and to cause the robot to assemble the component kit selected based on the determined priority order.

With this configuration, the robot system can assemble a plurality of types of component kits different from each other and to prevent work of assembling the component kits from being stopped.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, embodiments of the invention will be described with reference to the drawings.

Configuration of Robot System

First, a configuration of a robot system 1 will be described.

Figure 1:
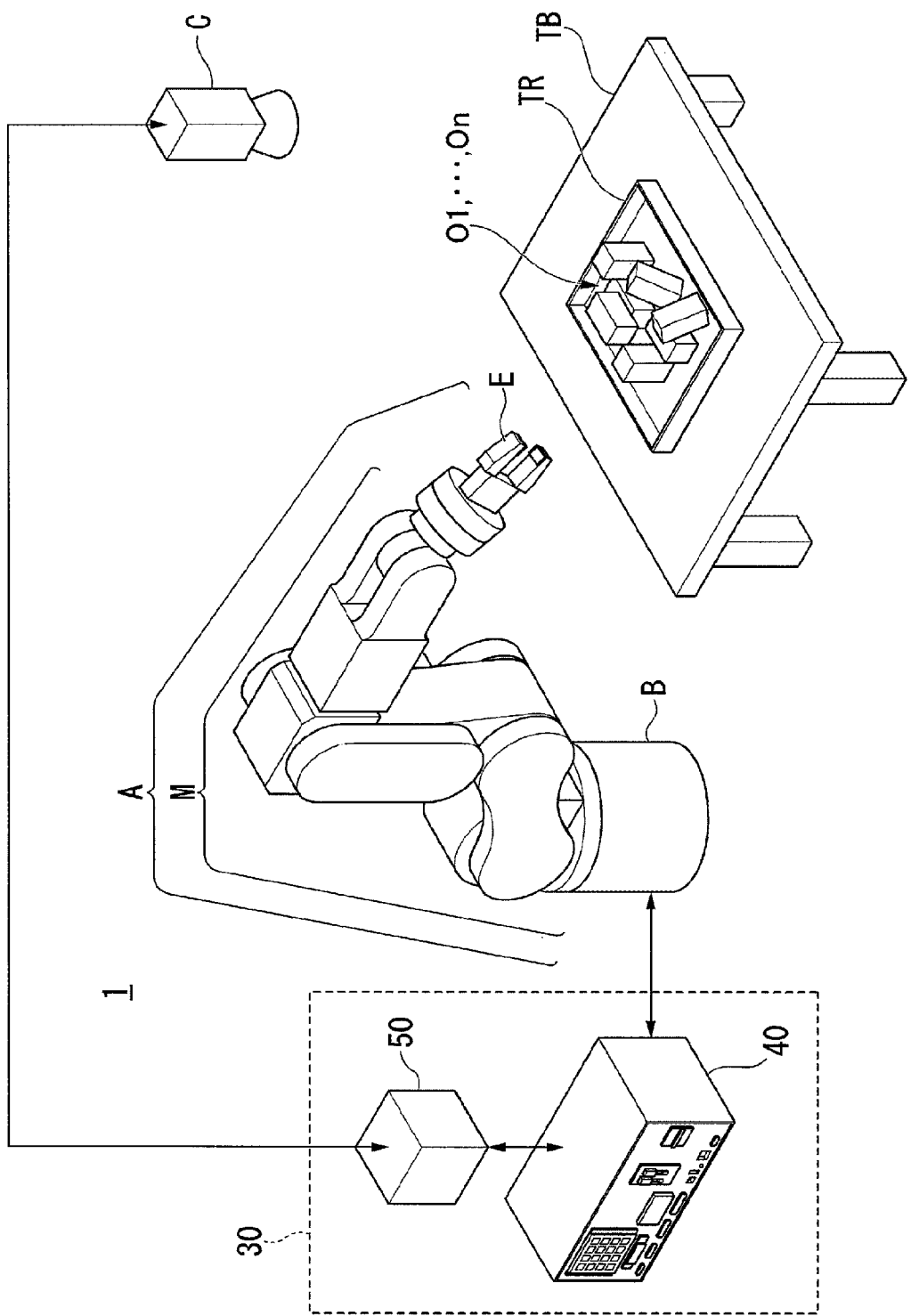
FIG. 1 is a diagram illustrating an example of a configuration of a robot system according to an embodiment.

FIG. 1 is a diagram illustrating an example of a configuration of the robot system 1 according to the embodiment. The robot system. 1 includes an image capturing device C, a robot 20, and a control device 30. The control device 30 includes a robot control device 40 and an image processing device 50. In the robot system 1, a portion or the whole of the image capturing device C, the robot 20, the robot control device 40, and the image processing device 50 may be integrally configured.

The image capturing device C is a camera including a charge coupled device (CCD), a complementary metal oxide semiconductor (CMOS), or the like, for example, which is an imaging device that converts condensed light into an electric signal. In this example, the image capturing device C is provided at a position where the upper surface of a work stand TB illustrated in FIG. 1 can be imaged. The work stand TB is, for example, a stand such as a table. The work stand TB may be any stand in place of the table as long as a target such as a floor surface, a jig, a shelf or the like can be placed thereon. The image capturing device C may be configured to capture a still image in a range that the image capturing device C can image or may be configured to capture a moving image in the range. The image capturing device C may be a point group generation device that generates a point group indicating a three-dimensional shape in a range the image capturing device C can image, instead of a camera. In this case, the image capturing device C is a device capable of acquiring information indicating a three-dimensional shape of the range, such as a device capable of stereoscopically imaging the range.

The image capturing device C is communicably connected to the image processing device 50 via a cable. Wired communication via a cable is performed according to standards such as Ethernet (registered trademark) and the universal serial bus (USB), for example. The image capturing device C may be configured to be connected to the image processing device by wireless communication performed according to a communication standard such as Wi-Fi (registered trademark).

The robot 20 is a single-arm robot including a movable portion A and a supporting stand B for supporting the movable portion A. The single-arm robot is a robot including one arm like the movable portion A in this example. The robot 20 may be a multi-arm robot instead of a single-arm robot. The multi-arm robot is a robot including two or more arms (for example, two or more movable portions A). Among the multiple arm robots, a robot including two arms (for example, two movable portions A) is also called a dual-arm robot. That is, the robot 20 may be a dual-arm robot including two arms or a multi-arm robot including three or more arms (for example, three or more movable portions A). The robot 20 may be another robot such as a SCARA robot (horizontal articulated robot), an orthogonal coordinate robot, a cylindrical robot, or the like. The orthogonal coordinate robot is, for example, a gantry robot.

The movable portion A includes an end effector E and a manipulator M.

The end effector E is an end effector that holds an object. In this example, the end effector E includes a finger portion, and holds the object by gripping the object by the finger portion. Instead of this, the end effector E may be configured to hold the object by lifting the object with suction of air, magnetic force, another jig, or the like. In this example, "holding" means to bring the object into a state where it is possible to lift the object.

The end effector E is communicably connected to the robot control device 40 by a cable. With this configuration, the end effector E performs an operation based on a control signal acquired from the robot control device 40. Wired communication via a cable is performed according to standards such as Ethernet (registered trademark) and USB, for example. The end effector E may be configured to be connected to the robot control device 40 by wireless communication performed according to a communication standard such as Wi-Fi (registered trademark).

The manipulator M includes six joints. Each of the six joints includes an actuator (not illustrated). That is, the movable portion A including the manipulator M is a six-axis vertical articulated arm. The movable portion A performs operation of degree of freedom of six axes by a cooperative operation of the supporting stand B, the end effector E, the manipulator M, and each actuator of the six joints of the manipulator M. The movable portion A may be configured to operate with the degree of freedom of five axes or less, or may be configured to operate with the degree of freedom of seven axes or more.

Each of the six actuators (included in the joints) included in the manipulator M is connected to the robot control device 40 via a cable so as to communicate with each other. With this configuration, each of the actuators operates the manipulator M based on the control signal acquired from the robot control device 40. Wired communication via a cable is performed according to standards such as the Ethernet (registered trademark) and USB, for example. In addition, some or all of the six actuators included in the manipulator M are configured to be connected to the robot control device by wireless communication performed according to a communication standard such as Wi-Fi (registered trademark).

The control device 30 controls each of the image capturing device C and the robot 20. As described above, the control device 30 includes the robot control device 40 and the image processing device 50.

The robot control device 40 causes the robot 20 to perform work determined in advance based on an operation program stored in advance in a memory (not illustrated in FIG. 1) included in the robot control device 40. In this case, the robot control device 40 controls the image processing device 50 to cause the image capturing device C to image the range that the image capturing device C can image. Then, the robot control device 40 causes the image processing device 50 to perform processing based on a captured image captured by the image capturing device C. The robot control device 40 causes the robot 20 to perform work based on the result of processing by the image processing device 50.

In response to a request from the robot control device 40, the image processing device 50 causes the image capturing device C to image the range that the image capturing device C can image. The image processing device 50 acquires a captured image captured by the image capturing device C from the image capturing device C. The image processing device 50 performs processing based on the acquired captured image. Then, the image processing device 50 outputs information indicating the result of processing to the robot control device 40.

Outline of Work that Control Device Causes Robot to Perform

An outline of work that the control device 30 causes the robot 20 to perform will be described below.

As illustrated in FIG. 1, a container TR is placed on the upper surface of the work stand TB. The container TR is, for example, a tray. The container TR may be another container in which a target can be placed (accommodated), instead of the tray. In the container TR, a plurality of targets O1 to On are placed. In the following, as an example, a case where eight targets, targets O1 to O8 are placed will be described. In the container TR, the eight targets may be configured to be placed so as to be overlapped with each other, or may be configured to be placed without overlapping each other. In the example illustrated in FIG. 1, at least some of the eight targets overlap each other and are placed in the container TR.

Each of the targets O1 to O8 includes at least components whose types are different from one another among the components and a component kit in which two or more of the components are assembled with one another. The control device 30 operates the robot 20 to take out the targets O1 to O8 two by two from the container TR as an assembly target pair and assemble the taken out targets as a taken out assembly target pair, thereby assembling the component kit capable of being assembled using the assembly target pair. Then, the control device 30 operates the robot 20 to place the assembled component kit in the container TR as a new target. By repeating assembling of such a component kit, the control device 30 causes the robot 20 to perform an operation of assembling a finished product capable of being assembled using each of the targets O1 to O8 as work determined in advance.

In the following description, processing performed by the control device 30 when the robot 20 is caused to perform work determined in advance will be described in detail. In the following description, as an example, a case where each of the targets O1 to O8 is a plurality of types of components different from one another will be described. Here, the component is an industrial component such as, for example, a plate, a gear, a cover, and the like. However, instead of the industrial component, another component such as a component of daily necessities or component of living body may be allowed. In the example illustrated in FIG. 1, in order to simplify the drawing, the shape of each of the target O1 to the target O8 is represented by a rectangular parallelepiped shape. The shape of each of the targets O1 to O8 may be another shape instead of the rectangular parallelepiped shape.

Hardware configuration of robot control device and image processing device

Hereinafter, the hardware configuration of the robot control device 40 and the image processing device 50 will be described.

Figure 2:
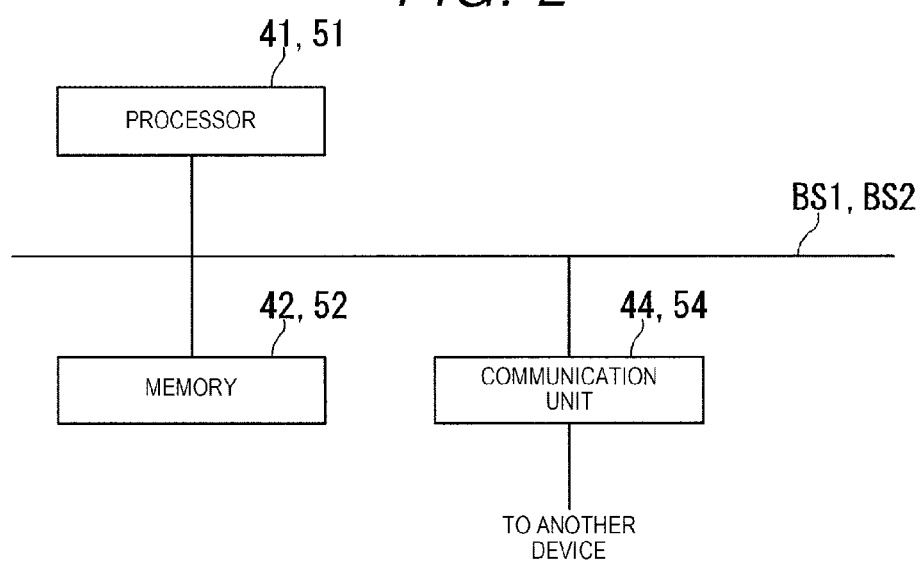
FIG. 2 is a diagram illustrating an example of a hardware configuration of a robot control device and an image processing device.

FIG. 2 is a diagram illustrating an example of a hardware configuration of the robot control device 40 and the image processing device 50. FIG. 2 illustrates the hardware configuration of the robot control device 40 (functional unit denoted by the reference numeral of 40 series in FIG. 2) and the hardware configuration of the image processing device 50 (functional unit denoted by the reference numeral of 50 series in FIG. 2) in an overlapping manner for the sake of convenience.

The robot control device 40 includes, for example, a processor 41, a memory 42, and a communication unit 44. The robot control device 40 communicates with each of the robot 20 and the image processing device 50 via the communication unit 44. These constituent elements are communicably connected to each other via a bus BS1.

The processor 41 is, for example, a central processing unit (CPU). The processor 41 may be another processor such as a field programmable gate array (FPGA) instead of the CPU. The processor 41 executes various programs stored in the memory 42.

The memory 42 includes, for example, a hard disk drive (HDD), a solid state drive (SSD), an electrically erasable programmable read-only memory (EEPROM), a read-only memory (ROM), a random access memory (RAM), and the like. The memory 42 may be an external storage device connected by a digital input/output port such as a USB, instead of the built-in memory of the robot control device 40. The memory 42 stores various pieces of information, various images, the operation program, and the like, to be processed by the robot control device 40.

The communication unit 44 is configured to include, for example, a digital input/output port such as the USB, the Ethernet (registered trademark) port, and the like.

The image processing device 50 includes, for example, a processor 51, a memory 52, and a communication unit 54. The image processing device 50 communicates with each of the image capturing device C and the robot control device 40 via the communication unit 54. These constituent elements are communicably connected to each other via a bus BS2.

The processor 51 is, for example, the CPU. The processor 51 may be another processor such as the FPGA instead of the CPU). The processor 51 executes various programs stored in the memory 52.

The memory 52 includes, for example, the HDD, the SSD, the EEPROM, the ROM, the RAM, and the like. The memory 52 may be an external storage device connected by a digital input/output port such as a USB, instead of the built-in memory of the image processing device 50. The memory 52 stores various pieces of information, various images, the operation program, and the like to be processed by the image processing device 50.

The communication unit 54 is configured to include, for example, a digital input and output port such as the USB, the Ethernet (registered trademark) port, and the like.

At least one of the robot control device 40 and the image processing device 50 may be configured to include either one or both of an input device such as a keyboard, a mouse, a touch pad, and a display device including a display.

Functional configuration of Robot control device and image processing device

Figure 3:
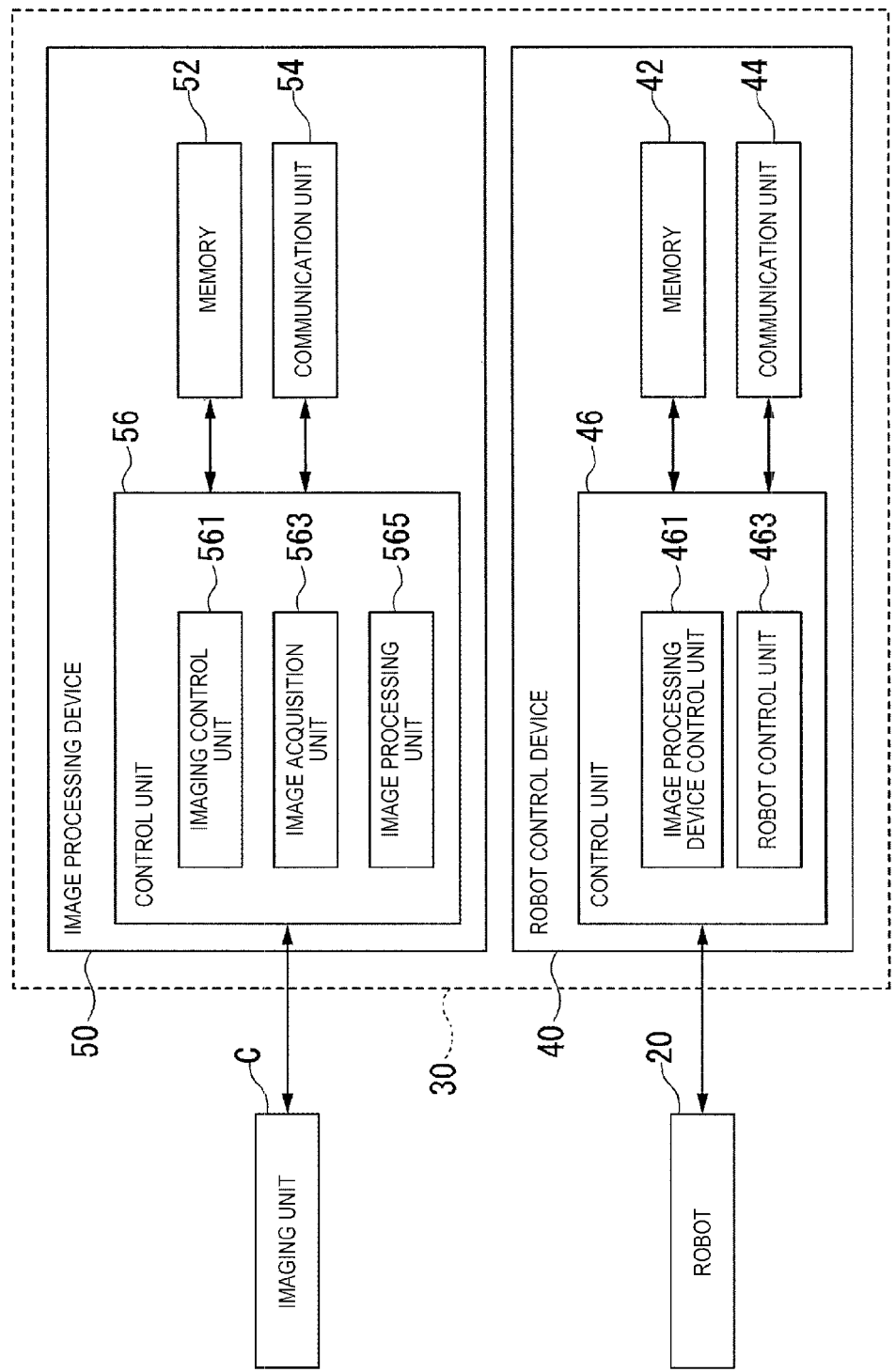
FIG. 3 is a diagram illustrating an example of a functional configuration of the robot control device and the image processing device.

Hereinafter, with reference to FIG. 3, the functional configuration of the robot control device 40 and the image processing device 50 will be described. FIG. 3 is a diagram illustrating an example of the functional configuration of the robot control device 40 and the image processing device 50.

The robot control device 40 includes the memory 42, the communication unit 44, and a control unit 46.

The control unit 46 controls the entire robot control device 40. The control unit 46 includes an image processing device controller 461 and a robot control unit 463. These functional units included in the control unit 46 are realized, for example, by the processor 41 executing various commands stored in the memory 42. Some or all of the functional units may be hardware functional units such as a large scale integration (LSI) and an application specific integrated circuit (ASIC), and the like.

The image processing device controller 461 outputs various requests to the image processing device 50 and controls the image processing device 50.

The robot control unit 463 reads an operation program stored in advance in the memory 42 from the memory 42. The robot control unit 463 operates the robot 20 according to the read operation program. The robot control unit 463 causes the image processing device controller 461 to control the image processing device 50 according to the operation program. Then, the robot control unit 463 operates the robot 20 using the processing result of the image processing device 50.

The image processing device 50 includes the memory 52, the communication unit 54, and a control unit 56.

The control unit 56 controls the entire image processing device 50. The control unit 56 includes an imaging control unit 561, an image acquisition unit 563, and an image processing unit 565. These functional units included in the control unit 56 are realized, for example, by the processor 51 executing various commands stored in the memory 52. Some or all of the functional units may be hardware functional units such as the LSI, the ASIC, and the like.

In response to a request from the robot control device 40, the imaging control unit 561 causes the image capturing device C to image the range that the image capturing device C can image.

The image acquisition unit 563 acquires a captured image captured by the image capturing device C from the image capturing device C.

The image processing unit 565 performs processing based on the captured image acquired from the image capturing device C by the image acquisition unit 563.

Processing performed by robot control device and image processing device

Figure 4:
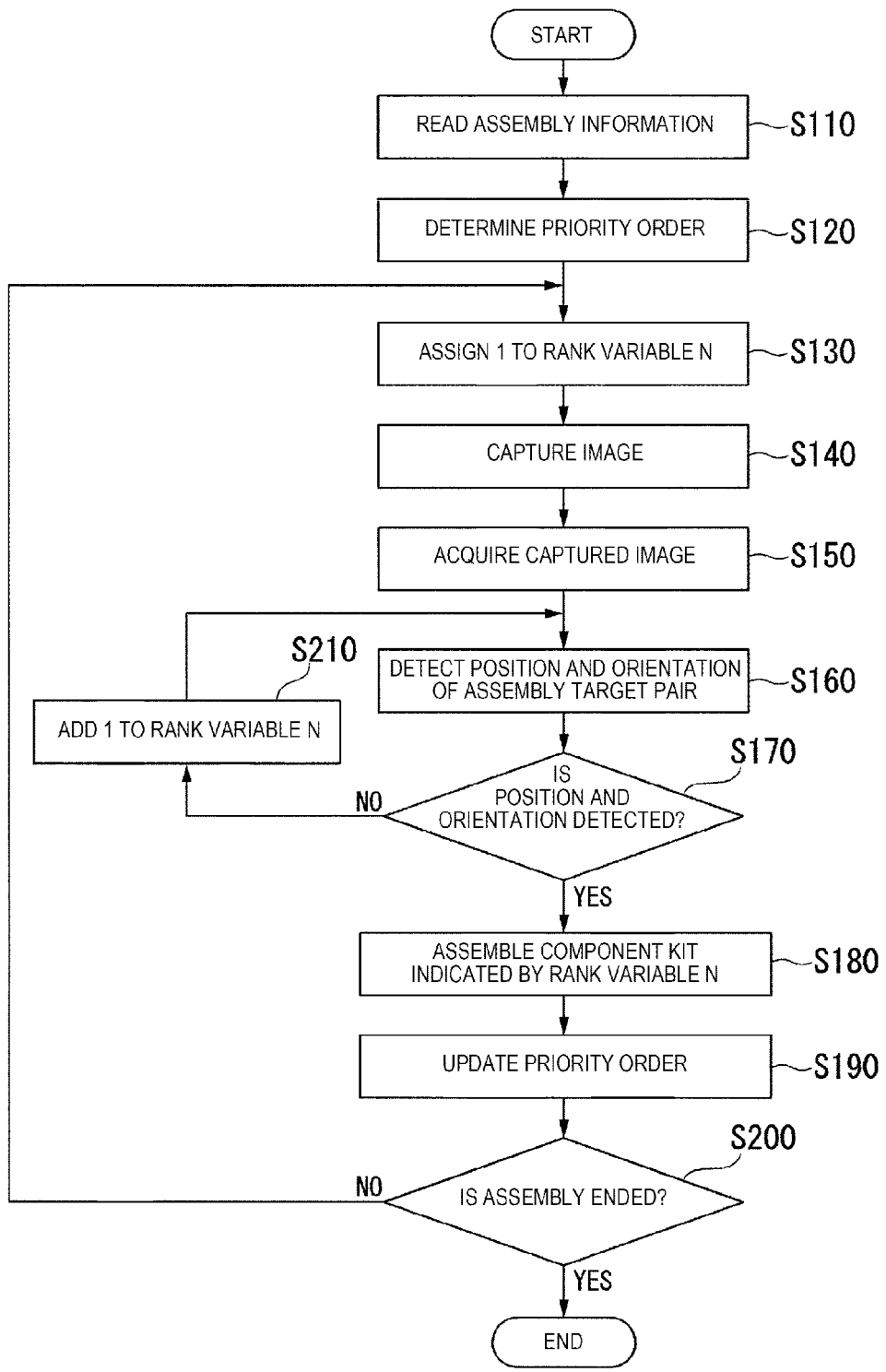
FIG. 4 is a flowchart illustrating an example of a flow of processing performed by the robot control device and the image processing device.

Hereinafter, with reference to FIG. 4, a flow of processing performed by the robot control device 40 and the image processing device 50 will be described. FIG. 4 is a flowchart illustrating an example of a flow of processing performed by the robot control device 40 and the image processing device 50. Processing of the flowchart illustrated in FIG. 4 illustrates processing executed by the robot control device 40 according to the operation program stored in advance in the memory 42 and processing performed by the image processing device 50 in response to a request from the robot control device 40. The manner of cooperation between the robot control device 40 and the image processing device 50 may be any way of cooperation as long as processing of the flowchart illustrated in FIG. 4 can be realized. For that reason, description of the request and response between the robot control device 40 and the image processing device 50 will be omitted.

The image processing unit 565 reads assembly information stored in advance in the memory 52 from the memory 52 (step S110). Here, assembly information will be described with reference to FIG. 5.

Figure 5:
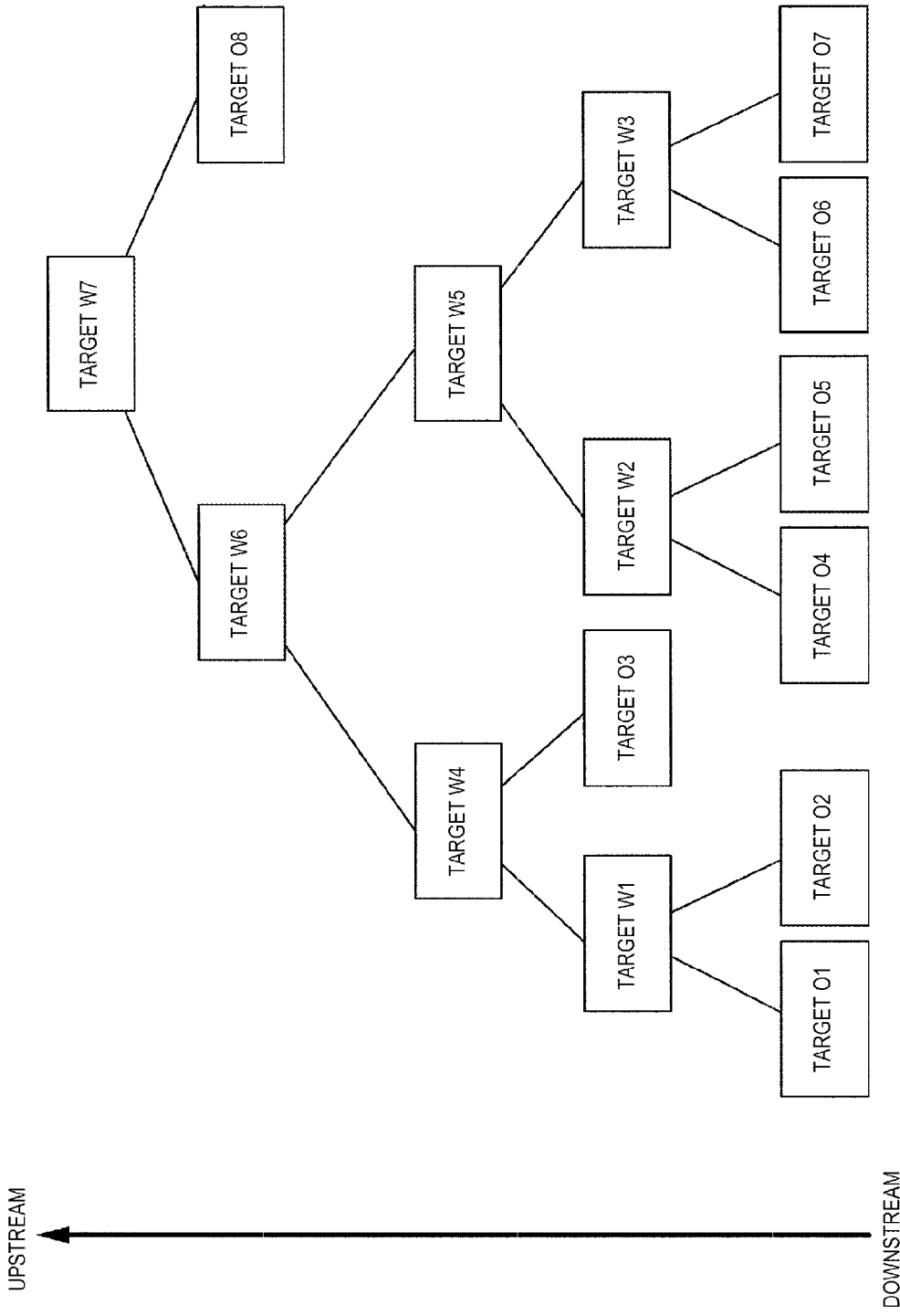
FIG. 5 is a diagram illustrating an example of assembly information.

FIG. 5 is a diagram illustrating an example of assembly information. Assembly information is information indicating a process of assembling a finished product using each of the targets O1 to O8. In the example illustrated in FIG. 5, a direction indicated by the arrow illustrated in FIG. 5 indicates the upstream side of the process, and a direction opposite to the direction indicates the downstream side of the process. In the following description, for convenience of explanation, each of fifteen targets illustrated in FIG. 5 is referred to as a node, and a line connecting nodes is referred to as a link.

In the assembly information illustrated in FIG. 5, as fifteen nodes, targets W1 to W7, each of which is each of seven component kits capable of being assembled using each of a targets O1 to O8 placed in the container TR, and the targets O1 to O8 are included. In FIG. 5, two nodes connected from the downstream side to a node X which is a certain node via a link indicate an assembly target pair of the node X. For example, the target O1 and the target O2, which are two nodes connected from the downstream side to the target W1 via a link, are the assembly target pair of the target W1. For example, the target W2 and the target W3, which are two nodes connected from the downstream side to the target W5 via a link, are the assembly target pair of the target W5. Further, for example, the target W6 and the target O8, which are two nodes connected from the downstream side to the target W7 via a link, are the assembly target pair of the target W7.

In the assembly information illustrated in FIG. 5, the target W7 positioned at the most upstream side represents the finished product. For that reason, in FIG. 5, the target W7 is not an assembly target pair of other targets. A configuration in which the target positioned at the most upstream in assembly information does not necessarily represent a finished product but represents a component kit used in other work may be adopted.

After the image processing unit 565 reads such assembly information from the memory 52 in step S110, the image processing unit 565 determines a priority order relating to the order of assembling each of the targets W1 to W7, which are the seven component kits described above (step S120). Here, processing of step S120 will be described.

The image processing unit 565 determines the priority order relating to the order of assembling each of the targets W1 to W7, which are the seven component kits described above, based on a predetermined rule determined in advance. The predetermined rule includes, for example, each of the following rules 1) to 3).

1) The priority order of a node on the downstream side is set higher than that on the upstream side.

2) Two nodes which are the assembly target pair in each node that is present on a route from the most upstream to the downstream via a link are compared, and the priority order of the node having the largest number of nodes up to the most downstream connected to each of the two nodes is set higher. That is, among the two nodes, increase the priority order of a node which is a target to be assembled and has a larger number of a plurality of targets placed in the container TR. In other words, among the component kits capable of being assembled using the targets placed in the container TR, the priority order of the component kit having the largest number of times of assembling the target is set higher. In this case, among the component kits capable of being assembled using the component kit included in the target placed in the container TR, the priority order of the component kit having the largest number of times of assembling the targets is determined as the first place. However, in a case where there are two or more component kits having the same number of times of assembling the target, regarding the two or more component kits, for example, a configuration in which the priority order is randomly determined may be adopted or a configuration in which the priority order is determined by another method may be adopted.

3) The priority order of component kits capable of being continuously assembled is set higher than the priority order of other component kits. For example, in a case where there is a component kit capable of being assembled using the component kit assembled immediately before, the priority order of the component kit is determined as the first place. Further, in a case where there is a component kit capable of being assembled using the component kit, the priority order of the component kit is determined as the second place. By repeating this, the priority order of component kits capable of being continuously assembled is made higher than the priority of other component kits.

In the example illustrated in FIG. 5, the priority orders are higher in order of the target W2, the target W3, the target W1, the target W5, the target W4, the target W6, and the target W7, or in order of the target W3, the target W2, the target W1, the target W5, the target W4, the target W6, and the target W7. In the following description, as an example, a case where the image processing unit 565 determines the priority order so as to be higher in order of the target W2, the target W3, the target W1, the target W5, the target W4, the target W6, and the target W7 in step S120 will be described. As the predetermined rule, instead of the configuration in which the rules 1) to 3) described above, a rule having a configuration in which a portion of the rules 1) to 3) described above is included may be adopted, a rule having a configuration in which a rule specified by the user in advance or another rule is included in addition to the portion of the rules 1) to 3) described above, may be adopted, or a rule having a configuration in which a rule specified by the user in advance or another rule is included in addition to all of the rules 1) to 3) described above, may be adopted.

After the priority order regarding the order of assembling each of the targets W1 to W7, which are the seven component kits described above is determined in step S120, the image processing unit 565 generates a ranking variable N which is a variable for storing a value indicating the priority order. The image processing unit 565 assigns 1 to the generated ranking variable N, that is, initializes the ranking variable N to 1 (step S130).

Next, the imaging control unit 561 causes the image capturing device C to image the range that the image capturing device C can image (step S140).

Next, the image acquisition unit 563 acquires the captured image captured by the image capturing device C in step S140 from the image capturing device C (step S150).

Next, based on the captured image acquired by the image acquisition unit 563 in step S150, the image processing unit 565 detects the position and pose of each of the assembly target pairs having the priority order indicated by the ranking variable N from the captured image (step S160). More specifically, the image processing unit 565 detects the types of the targets included in the captured image, for example, by pattern matching or the like. The image processing unit 565 detects the position and pose of each of the two types of targets included in the assembly target pair, among the detected types of targets. In this example, the position and pose of each target is represented by the position and pose of the center of gravity of each target. A method of detecting the position and pose of each of the two types of targets may be a known method or a method to be developed from now. After the position and pose of each of the two types of targets is detected, the image processing unit 565 makes a transition to step S170. Further, in a case where at least one of the two types of targets is not detected or when the position and pose of at least one of the two types of targets cannot be detected, the image processing unit 565 makes a transition to step S170.

Next, the image processing unit 565 determines whether or not the position and pose of each of the assembly target pairs of the targets having the priority order indicated by the ranking variable N are detected from the captured image in step S160 (step S170). In a case where it is determined that the position and pose of each of the assembly target pairs of the targets having the priority order indicated by the ranking variable N are not detected from the captured image in step S160 (NO in step S170), the image processing unit 565 adds 1 to the value stored in the ranking variable N (step S210), and makes a transition to step S160. Then, the image processing unit 565 detects the position and pose of each of the assembly target pairs of the targets having the priority order indicated by the ranking variable N storing the value to which 1 is added in step S210 from the captured image. On the other hand, in a case where it is determined that the position and pose of each of the assembly target pairs of the targets having the priority order indicated by the ranking variable N are detected from the captured image in step S160 (YES in step S170), the image processing unit 565 outputs information indicating the position and pose of each of the assembly target pairs to the robot control device 40. Then, the robot control unit 463 causes the robot 20 to operate based on the acquired position and pose indicated by the acquired information and causes the robot 20 to assemble the target indicated by the ranking variable N (that is, component kit indicated by the ranking variable N) (step S180). Here, the method by which the robot 20 assembles the target in step S180 may be a method using a dedicated jig, a method based on a cooperative operation with another robot, or any other method capable of assembling the target. After the target is assembled, the robot control unit 463 operates the robot 20 to place the assembled target in the container TR. In this case, the robot control unit 463 may be configured to operate the robot 20 to place a target (that is, a component kit), which is assembled immediately before, on a target necessary for assembling a target (that is, a component kit having the priority order of the third place or lower, for example, a component kit having the lowest priority order) having a priority order of the third place or lower or may be configured to place the target in an area where nothing is placed in the container TR. In a case where the target assembled immediately before is not placed in the container TR in step S180, the robot control unit 463 places the target in the container TR in step S190 described later.

Next, the image processing unit 565 updates the current priority order (step S190). That is, the image processing unit 565 re-determines the priority order of the targets that have not been assembled up to now among the seven targets described above based on a rule including the rules 1) to 3) described above. In this case, the image processing unit 565 excludes the targets that have already been assembled from assembly targets. After the priority order is updated in step S190, the robot control unit 463 may be configured to operate the robot 20 to place a target (that is, a component kit), which is assembled immediately before, on a target necessary for assembling a target (that is, a component kit having the priority order of the second place or lower, for example, a component kit having the lowest priority) having a priority order of the second place or lower or may be configured to place the target in an area where nothing is placed in the container TR. In a case where the target assembled immediately before is not placed in the container TR in step S190, the robot control unit 463 places the target in the container TR in step S180.

Next, the robot control unit 463 determines whether assembly of the finished product is ended (step S200). In a case where the robot control unit 463 determines that assembly of the finished product is not ended (NO in step S200), the image processing unit 565 makes a transition to step S130, assigns 1 to the ranking variable N again, that is, initializes the ranking variable N to 1. On the other hand, in a case where it is determined that assembly of the finished product is ended (YES in step S200), the robot control unit 463 ends processing.

As described above, by performing processing of the flowchart shown in FIG. 4, the control device 30 (that is, robot control device 40 and the image processing device 50) can assemble a plurality of types of component kits different from each other and can prevent the operation of assembling the component kit from being stopped. As a result, the control device 30 can assemble the finished product using the targets placed in the container TR.

Figure 6:
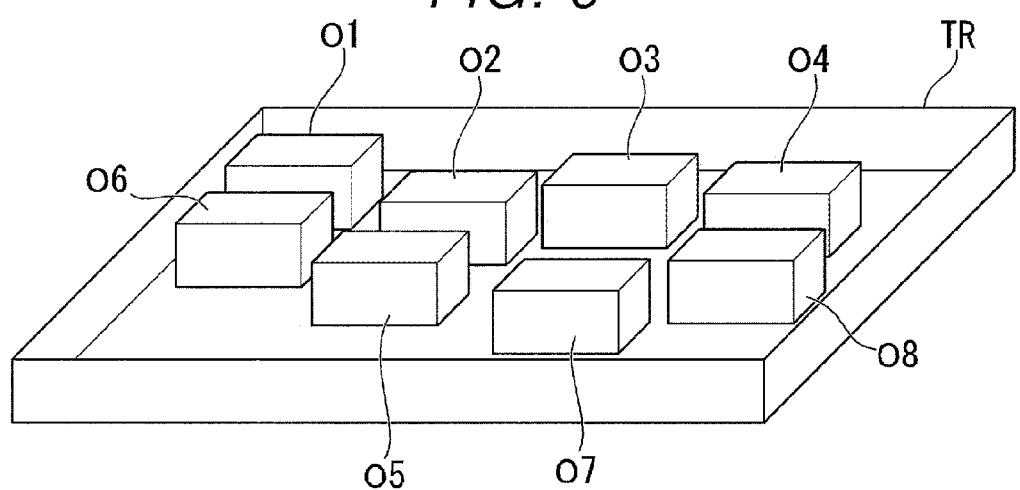
FIG. 6 is a diagram illustrating an example of a placement state of targets O1 to O8 in a container TR.

Specific example 1 of determination of priority order and process until the finished product is assembled In the following, description will be made on a specific example 1 of determination of a priority order and a process until a finished product is assembled by processing of the flowchart illustrated in FIG. 4. In the specific example 1, as illustrated in FIG. 6, a case where all the targets placed in the container TR are not overlapped with each other will be described. FIG. 6 is a diagram illustrating an example of a placement state of the targets O1 to O8 in the container TR.

In the example illustrated in FIG. 6, the priority order determined by processing of step S120 in the flowchart illustrated in FIG. 4 is as illustrated below.

First place: target W2
Second place: target W3
Third place: target W1
Fourth place: target W5
Fifth place: target W4
Sixth place: target W6
Seventh place: target W7

Here, targets W1 to W7 are the targets W1 to W7 illustrated in FIG. 5. In this case, the robot 20 is operated by the control device 30 according to processing of the flowchart illustrated in FIG. 4, and the target W7 which is a finished product is assembled by the following seven processes (first step A to seventh step A illustrated below).

First step A: The target W2 having the priority order of the first place is assembled. Thereafter, since there is no target capable of being assembled using the target W2 assembled immediately before (since the target W3 is not assembled at this point in time), the update of priority orders is made based on the rules 1) to 3) described above and the rank of the targets associated with each of the second place to seventh place is incremented by one.

Second step A: The target W3 of which priority order is updated to the first place is assembled. Thereafter, since the target W5 is present as a target which can be assembled using the target W3 assembled immediately before, the priority order is updated based on the rules 1) to 3) described above. The priority order after this update is made is illustrated below.

First place: target W5
Second place: target W6
Third place: target W7
Fourth place: target W1
Fifth place: target W4

Third step A: The target W5 of which priority order is updated to the first place is assembled. Thereafter, since there is no target capable of being assembled using the target W5 assembled immediately before (since the target W4 is not assembled at this point in time), the update of priority order is made based on the rules 1) and 2) described above. The priority orders after this update is made is as illustrated below.
   First place: target W1
   Second place: target W4
   Third place: target W6
   Fourth place: target W7

Fourth step A: The target W1 of which priority order is updated to the first place is assembled. Thereafter, since the target W4 is present as a target which can be assembled using the target W1 assembled immediately before, the update of priority order is made based on the rules 1) to 3) described above, and the rank of the targets associated with each of the second place to fourth place is incremented by one.

Fifth step A: The target W4 of which priority order is updated to the first place is assembled. Thereafter, since the target W6 is present as a target which can be assembled using the target W4 assembled immediately before, the update of priority order is made based on the rules 1) to 3) described above, the priority order of the target W6 becomes the first place, and the priority order of the target W7 becomes the second place.

Sixth step A: The target W6 of which priority order is updated to the first place is assembled. Thereafter, the priority order of the remaining target W7 becomes the first place.

Seventh step A: The target W7 of which the priority order is updated to the first place is assembled.

As such, when all the targets placed in the container TR are not overlapped with each other, the control device 30 performs processes of each the steps in the order of the first step A, the second step A, the third step A, the fourth step A, the fifth step A, the sixth step A, and the seventh step A, and causes the robot 20 to assemble the target W7 which is a finished product.

Figure 7:
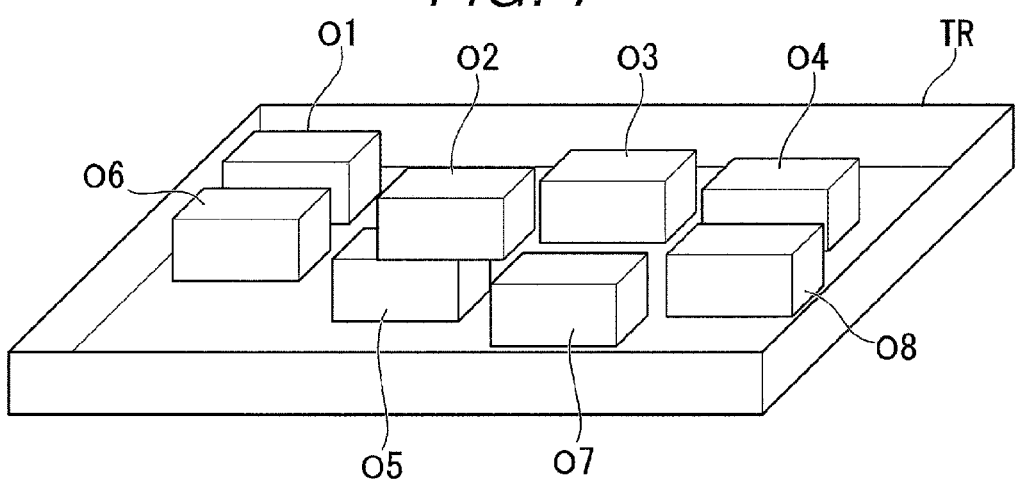
FIG. 7 is a diagram illustrating another example of the placement state of the target O1 to the target O8 in the container TR.

Specific example 2 of determination of priority order and process until the finished product is assembled In the following, description will be made on a specific example 2 of determination of a priority order and a process until a finished product is assembled by processing of the flowchart illustrated in FIG. 4. In the specific example 2, as illustrated in FIG. 7, a case where some of the targets placed in the container TR are overlapped will be described. FIG. 7 is a diagram illustrating another example of the placement state of a targets O1 to O8 in the container TR.

In the example illustrated in FIG. 7, the target O2 is placed on the target O5. In this example, the placement state of each of the target O1, the target O3, the target O4, the target O6, the target O7, and the target O8 is the same as the placement state illustrated in FIG. 6. Even in this case, the priority order determined by the processing of step S120 in the flowchart illustrated in FIG. 4 is as illustrated below.
   First place: target W2
   Second place: target W3
   Third place: target W1
   Fourth place: target W5
   Fifth place: target W4
   Sixth place: target W6
   Seventh place: target W7

Here, targets W1 to W7 are the targets W1 to W7 illustrated in FIG. 5. In this case, the robot 20 is operated by the control device 30 according to the processing of the flowchart illustrated in FIG. 4, and the target W7 which is a finished product is assembled by the following seven processes (first step B to seventh step B illustrated below).

First step B: Since the target O5 is under the target O2, the target O5 is not detected. For that reason, the target W2 having the first priority order is not assembled, and the target W3 having the second priority order is assembled. Thereafter, since there is no target capable of being assembled using the target W3 assembled immediately before (since the target W2 is not assembled at this point in time), the update of priority order is made based on the rules 1) and 2) described above. The priority order after this update is made is as illustrated below).
   First place: target W2
   Second place: target W1
   Third place: target W5
   Fourth place: target W4
   Fifth place: target W6
   Sixth place: target W7

Second step B: Even at this point in time, since the target O5 is under the target O2, the target O5 is not detected. For that reason, the target W2 having the priority order of the first place is not assembled. Therefore, the target W1 having the priority order of the second place is assembled. In this case, since the target O2 placed on the target O5 is put into the target O1, the target O5 can be detected. Thereafter, since the target W4 is present as a target which can be assembled using the target W1 assembled immediately before, the update of priority order is made based on the rules 1) to 3) described above. The priority order after this update is made is as illustrated below.
   First place: target W4
   Second place: target W6
   Third place: target W7
   Fourth place: target W2
   Fifth place: target W5

Third step B: The target W4 of which priority order is updated to the first place is assembled. Thereafter, since there is no target capable of being assembled using the target W4 assembled immediately before (since the target W5 is not assembled at this point in time), the update of priority order is made based on the rules 1) and 2) described above, The priority order after this update is made is as illustrated below.
   First place: target W2
   Second place: target W5
   Third place: target W6
   Fourth place: target W7

Fourth step B: Since the target O5 can be detected at this point in time, the target W2 of which priority order is updated to the first place is assembled. Thereafter, since the target W5 is present as a target which can be assembled using the target W2 assembled immediately before, the update of priority order is made based on rules 1) to 3), and the rank of the targets associated with each of the second place to fourth place is incremented by one.

Fifth step B: The target W5 of which priority order is updated to the first place is assembled. Thereafter, since the target W6 is present as a target which can be assembled using the target W5 assembled immediately before, the update of the priority orders is made based on the rules 1) to 3) described above, the priority order of the target W6 becomes the first place, and the priority order of the target W7 becomes the second place.

Sixth step B: The target W6 of which priority order is updated to the first place is assembled. Thereafter, the priority order of the remaining target W7 becomes the first place.

Seventh step B: The target W7 of which the priority order is updated to the first place is assembled.

As such, in a case where the target O2 is placed on the target O5 in the container TR, the control device 30 performs processes of each the steps in the order of the first step B, the second step B, the third step B, the fourth step B, the fifth step B, the sixth step B, and the seventh step B, and causes the robot 20 to assemble the target W7 which is a finished product. That is, the control device 30 can assemble a finished product using a plurality of types of targets placed in bulk in a certain container (container TR in this example).

In the above description, although only the targets (that is, target O1 to target O8) necessary for assembling one target W7 which is a finished product are placed in the container TR, a configuration in which targets necessary for assembling a plurality of finished products are placed instead may be adopted. In this case, some or all of the plurality of finished products may be a plurality of types of finished products different from each other.

In the case where the robot control device 40 and the image processing device 50 described above constitute the control device 30 as a single unit, the control device 30 includes one processor (for example, processor 41 or processor 51 described above), one memory (for example, memory 42 or memory 52 described above), and one communication unit (for example, communication unit 44 or communication unit 54 described above). The robot control device 40 may be configured to be controlled by the processor 51 included in the image processing device 50, or may be configured to be controlled by a processor included in another information processing device connected to the robot control device 40 via a network. The image processing device 50 may be configured to be controlled by the processor 41 of the robot control device 40 or may be configured to be controlled by a processor included in another information processing apparatus connected to the image processing device 50 via a network.

As described above, the robot 20 causes the image capturing device (in this example, the image capturing device C) to image a container (in this example, container TR) in which a plurality of targets are placed to overlap at least in part with one another, in which the plurality of targets includes at least components whose types are different from one another (in this example, targets O1 to O8) among the components and a component kit in which two or more of the components are assembled with one another, detects types, positions and poses of the plurality of targets based on a captured image captured by the image capturing device, determines a priority order of one or more of component kits (in this example, targets W1 to W7) capable of being assembled using the targets placed in the container according to the detected types, the detected positions and the detected poses, and assembles the component kit selected based on the determined priority order. With this configuration, the robot 20 can assemble a plurality of different types of component kits different from each other and to prevent work of assembling the component kits from being stopped.

The robot 20 assembles the selected component kit based on the determined priority order, and then places the assembled component kit in the container. With this configuration, the robot 20 can assemble other component kit using the assembled component kit.

When the assembled component kit is placed in the container, the robot 20 updates the determined priority order and places the assembled component kit on the target necessary for assembling the component kit having the priority order of the second place or lower after the update. With this configuration, the robot 20 can prevent the component kit having the priority order of the first place from being not assembled by the placed component kit.

In the robot 20, a finished product is included in one or more of the component kits capable of being assembled using the target placed in the container. With this configuration, the robot 20 can assemble a plurality of types of component kits different from each other and can assemble a plurality of types of finished products different from each other.

The robot 20 determines a priority order of the component kit having the largest number of times of assembling the target among the component kits capable of being assembled using the component kits included in the targets as the first place. With this configuration, the robot 20 can improve efficiency of assembling the component kit.

In a case where there is the component kit capable of being assembled using the component kit assembled immediately before, the robot 20 determines the priority order of the component kit capable of being assembled by using the component kit assembled immediately before as the first place, instead of the component kit having the largest number of times of assembling the target. With this configuration, the robot 20 can improve efficiency of assembling the component kit more reliably.

Although the embodiment of the invention has been described in detail with reference to the drawings, the specific configuration is not limited to this embodiment, and various modifications, substitutions, deletions, and the like may be made thereto without departing from the gist of the invention.

Further, a program for realizing the functions of any constituent unit in the devices (for example, robot control device 40 and image processing device 50) described above may be recorded in a computer readable recording medium and the program may be read by a computer system to be executed. The "computer system" referred to here includes an operating system (OS) and hardware such as peripheral equipment. The "computer readable recording medium" refers to a storage device such as a portable medium like a flexible disk, a magneto-optical disk, a ROM, and a compact disk (CD)-ROM, and a hard disk built in a computer system. Furthermore, the "computer readable recording medium" includes a medium that holds a program for a certain period of time, such as a volatile memory (RAM) inside a computer system serving as a server or a client in a case where a program is transmitted via a network such as the Internet or a communication line such as a telephone line.

Further, the program described above may be transmitted from a computer system in which the program is stored in a storage device or the like to another computer system via a transmission medium or by a transmission wave in a transmission medium. Here, the "transmission medium" for transmitting a program refers to a medium having a function of transmitting information, by a network (communication network) such as the Internet and a communication line (communication channel) such as a telephone line.

The program described above may be for realizing a portion of the functions described above. Furthermore, the program described above may be a so-called difference file (difference program) which can realize the function described above by a combination with a program already recorded in the computer system.

The entire disclosure of Japanese Patent Application No. 2017-189825, filed Sep. 29, 2017 is expressly incorporated by reference herein.

What is claimed is:

1. A robot connected to an image capturing device, the robot comprising:
    an end effector configured to operate with a plurality of targets;
    a memory configured to store a program and an initial priority order of an assemble operation of the plurality of targets; and
    a processor configured to execute the program so as to:
        cause the image capturing device to capture an image of a container in which the plurality of targets are placed as an initial state of the plurality of targets prior to the assemble operation, at least two targets of the plurality of targets being partially overlapped one another, the at least two overlapped targets including a first target and a second target that is on the first target, the plurality of targets including components whose types are different from one another among the components, a component kit being made by assembling two or more of the components with one another by the robot;
        detect types, positions and poses of the plurality of targets based on the captured image;
        obtain the initial priority order of the assemble operation from the memory;
        determine whether the initial priority order of one or more of the component kits being assembled using the plurality of targets placed in the container is operable according to the detected types, the detected positions and the detected poses;
        modify the initial priority order to a modified priority order when the first target of the at least two overlapped targets is in a first operation under the initial priority order;
        cause the robot to assemble at least two targets of the plurality of targets, except for the first target, to make the component kit based on the modified priority order without moving the first target by the end effector; and
        repeat the causing of the image capturing device to capture the image, the detecting of the types, positions and poses of the plurality of targets, the determining whether the modified priority order is operable, the modifying of the modified priority order when the modified priority order is not operable, and the causing of the robot to assemble all of the plurality of targets to form a final product.

2. The robot according to claim 1,
    wherein the processor is configured to cause the robot to assemble the component kit and then to place the assembled component kit in the container.

3. The robot according to claim 1,
    wherein the processor is configured to determine if there are more components to assemble with the assembled component kit and, if there are more components to assemble, then the processor updates the initial priority order and continues assembling the component kit.

4. The robot according to claim 1,
    wherein the processor is configured to cause the robot to place the final product in the container.

5. The robot according to claim 1,
    wherein the processor is configured to determine a first place priority for the assemble operation is the component kit that has the largest number of assembling process steps needed to be completely assembled.

6. The robot according to claim 1,
    wherein, when the processor determines that there is the component kit which is assembled with the component kit that has been most recently assembled, the processor is configured to determine a first place priority for the assemble operation is the component kit which is assembled with the component kit that has been most recently assembled.

7. A control device that is connected to an image capturing device and controls a robot, comprising:
    a memory configured to store a program and an initial priority order of an assemble operation of a plurality of targets; and
    a processor configured to execute the program so as to:
        cause the image capturing device to capture an image of a container in which the plurality of targets are placed as an initial state of the plurality of targets prior to the assemble operation, at least two targets of the plurality of targets being partially overlapped one another, the at least two overlapped targets including a first target and a second target that is on the first target, the plurality of targets including components whose types are different from one another among the components, a component kit being made by assembling two or more of the components with one another by an end effector of the robot;
        detect types, positions and poses of the plurality of targets based on the captured image;
        obtain the initial priority order of the assemble operation from the memory;
        determine whether the initial priority order of one or more of the component kits being assembled using the plurality of targets placed in the container is operable according to the detected types, the detected positions and the detected poses;
        modify the initial priority order to a modified priority order when the first target of the at least two overlapped targets is in a first operation under the initial priority order;
        cause the robot to assemble at least two targets of the plurality of targets, except for the first target, to make the component kit based on the modified priority order without moving the first target by the end effector; and
        repeat the causing of the image capturing device to capture the image, the detecting of the types, positions and poses of the plurality of targets, the determining whether the modified priority order is operable, the modifying of the modified priority order when the modified priority order is not operable, and the causing of the robot to assemble all of the plurality of targets to form a final product.

8. A robot system comprising:
    a robot having an end effector, the end effector being configured to operate with a plurality of targets;
    an image capturing; device;
    a memory configured to store a program and an initial priority order of an assemble operation of the plurality of targets; and
    a processor configured to execute the program so as to:
        cause the image capturing device to capture an image of a container in which the plurality of targets are placed as an initial state of the plurality of targets prior to the assemble operation, at least two targets of the plurality of targets being partially overlapped one another, the at least two overlapped targets including a first target and a second target that is on the first target, the plurality of targets including components whose types are different from one another among the components, a component kit being made by assembling two or more of the components with one another by the robot;

detect types, positions and poses of the plurality of targets based on the captured image;

obtain the initial priority order of the assemble operation from the memory;

determine whether the initial priority order of one or more of the component kits being assembled using the plurality of targets placed in the container is operable according to the detected types, the detected positions and the detected poses;

modify the initial priority order to a modified priority order when the first target of the at least two overlapped targets is in a first operation under the initial priority order;

cause the robot to assemble at least two targets of the plurality of targets, except for the first target, to make the component kit based on the modified priority order without moving the first target by the end effector; and repeat the causing of the image capturing device to capture the image, the detecting of the types, positions and poses of the plurality of targets, the determining whether the modified priority order is operable, the modifying of the modified priority order when the modified priority order is not operable, and the causing of the robot to assemble all of the plurality of targets to form a final product.

* * * * *